United States Patent
Shin et al.

(10) Patent No.: US 10,112,561 B2
(45) Date of Patent: Oct. 30, 2018

(54) BUMPER UNIT OF VEHICLE AND METHOD FOR MANUFACTURING THE SAME

(71) Applicants: Hyundai Motor Company, Seoul (KR); Lotte Chemical Corporation, Seoul (KR)

(72) Inventors: Joong Hyun Shin, Gyeonggi-do (KR); Jeong Min Cho, Suwon-Gyeonggi-do (KR); Ji Ae Yong, Gangwon-do (KR); Jong Wook Lee, Daejeon (KR); Jung Tae Kim, Daejeon (KR); Myung Ho Lee, Gyeongsangbuk-do (KR)

(73) Assignees: Hyundai Motor Company, Seoul (KR); Lotte Chemical Corporation, Seoul (KR)

( * ) Notice: Subject to any disclaimer, the term of this patent is extended or adjusted under 35 U.S.C. 154(b) by 10 days.

(21) Appl. No.: 14/951,906

(22) Filed: Nov. 25, 2015

(65) Prior Publication Data

US 2017/0028951 A1   Feb. 2, 2017

(30) Foreign Application Priority Data

Jul. 28, 2015   (KR) .......................... 10-2015-0106730

(51) Int. Cl.
| | |
|---|---|
| *B60R 19/03* | (2006.01) |
| *B60R 19/02* | (2006.01) |
| *B60R 19/12* | (2006.01) |
| *B60R 19/44* | (2006.01) |
| *B60R 19/18* | (2006.01) |

(52) U.S. Cl.
CPC ............ *B60R 19/023* (2013.01); *B60R 19/03* (2013.01); *B60R 19/12* (2013.01); *B60R 19/18* (2013.01); *B60R 19/44* (2013.01); *B60R 2019/186* (2013.01)

(58) Field of Classification Search
CPC ......... B60R 19/02; B60R 19/44; B60R 19/12; B60R 19/03; B60R 19/023
USPC ...................................................... 293/147
See application file for complete search history.

(56) References Cited

U.S. PATENT DOCUMENTS 4,131,701 A * 12/1978 VanAuken ............ B29C 53/562
                                                        138/143
4,173,670 A * 11/1979 VanAuken ............ B29C 53/562
                                                        138/123

(Continued)

FOREIGN PATENT DOCUMENTS

| JP | 2006-347073 A | 12/2006 |
|---|---|---|
| KR | 2011-0103064 A | 9/2011 |

(Continued)

*Primary Examiner* — Hilary L Gutman
(74) *Attorney, Agent, or Firm* — Mintz Levin Cohn Ferris Glovsky and Popeo, P.C.; Peter F. Corless (57) ABSTRACT

A bumper unit of a vehicle includes a plurality of bumper beams arranged in a width direction of the vehicle, each of the bumper beams being coupled at both ends thereof to a vehicle body, a bumper reinforcement member configured as a molded synthetic-resin base, the base being formed with a plurality of through-holes in the width direction of the vehicle such that the bumper beams penetrate the base via the through-holes, and a strengthening band formed of reinforcement fiber tows, the strengthening band being configured to surround the exterior of the bumper reinforcement member.

7 Claims, 3 Drawing Sheets

(56) References Cited

U.S. PATENT DOCUMENTS

| | | | | |
|---|---|---|---|---|
| 4,214,932 | A * | 7/1980 | Van Auken | B65H 81/06 |
| | | | | 138/141 |
| 5,127,975 | A * | 7/1992 | Zackrisson | F16C 3/026 |
| | | | | 156/171 |
| 5,290,079 | A | 3/1994 | Syamal | |
| 6,889,716 | B2 * | 5/2005 | Lundberg | F16L 9/123 |
| | | | | 138/124 |
| 7,044,516 | B2 | 5/2006 | Kobayashi et al. | |
| 9,975,507 | B2 * | 5/2018 | Jayachandran | B60R 19/023 |
| 2004/0056469 | A1 * | 3/2004 | Karaki | B60R 19/00 |
| | | | | 280/784 |
| 2005/0029822 | A1 * | 2/2005 | Lee | B60R 19/18 |
| | | | | 293/155 |
| 2005/0031843 | A1 * | 2/2005 | Robinson | B32B 33/00 |
| | | | | 428/293.4 |
| 2008/0203743 | A1 * | 8/2008 | Dekeyser | B60R 19/18 |
| | | | | 293/120 |
| 2012/0067514 | A1 * | 3/2012 | Hull | B29C 70/12 |
| | | | | 156/245 |
| 2012/0141764 | A1 * | 6/2012 | Lee | B60R 19/03 |
| | | | | 428/297.4 |
| 2015/0015005 | A1 * | 1/2015 | Shin | B60R 19/18 |
| | | | | 293/120 |
| 2016/0025173 | A1 * | 1/2016 | Wagner | F16F 1/366 |
| | | | | 267/273 |
| 2016/0355150 | A1 * | 12/2016 | Yabu | B60R 19/03 |

FOREIGN PATENT DOCUMENTS

| | | |
|---|---|---|
| KR | 10-2013-0027684 A | 3/2013 |
| KR | 10-1286685 B1 | 7/2013 |
| KR | 10-1372004 B1 | 3/2014 |
| KR | 10-1398433 B1 | 6/2014 |
| KR | 10-1484227 B1 | 1/2015 |

* cited by examiner

BUMPER UNIT OF VEHICLE AND METHOD FOR MANUFACTURING THE SAME

CROSS-REFERENCE TO RELATED APPLICATION

This application claims under 35 U.S.C. § 119(a) the benefit of Korean Patent Application No. 10-2015-0106730, filed on Jul. 28, 2015, the entire contents of which are incorporated by reference herein.

BACKGROUND

1. Field of the Invention

The present invention relates to a bumper unit of a vehicle and a method for manufacturing the same, which can achieve a reduction in the weight of a vehicle body and satisfy vehicle collision safety requirements.

2. Description of the Related Art

In general, a vehicle is equipped with a bumper unit to protect the interior of a vehicle body and an indoor space from shocks applied by a head-on collision or a rear-end collision. The bumper unit includes a bumper beam provided in the width direction of the vehicle and other members for coupling with the vehicle body.

In addition, to protect the vehicle body from a collision, a high-strength material is required, and generally, a steel material is used. Moreover, the bumper beam may be formed of high-strength steel via various methods.

However, although the bumper beam formed of high-strength steel is excellent in terms of strength, the use of steel, which is a high-weight material, increases the weight of the vehicle body, and thus may be problematic in terms of deteriorated driving performance and fuel economy.

Therefore, there has been developed, for example, a bumper beam that is reduced in weight because a bumper unit is formed of a low-weight material such as, for example, a plastic material, rather than a steel material, or a bumper beam that is reduced in weight owing to a space defined therein. Various manufacturers have continuously focused effort on the development of bumper beams.

However, reducing the weight of the bumper beam by forming the bumper unit using a plastic material or by defining a space inside the bumper beam causes a considerable reduction in endurance strength in the event of a collision, resulting in performance deterioration, although use of a bumper beam made of plastic is excellent in terms of fuel economy and manufacturing costs.

The information provided in this section is merely for enhancement of understanding of the general background of the invention and should not be taken as an acknowledgment or any form of suggestion that the matters form the related art already known to a person skilled in the art.

SUMMARY

Therefore, the present invention provides a bumper unit of a vehicle and a method for manufacturing the same, which can achieve a reduction in the weight of a vehicle body and satisfy vehicle collision safety requirements.

In accordance with one aspect of the present invention, a bumper unit of a vehicle includes a plurality of bumper beams arranged in a width direction of the vehicle, each of the bumper beams being coupled at both ends thereof to a vehicle body, a bumper reinforcement member configured as a molded synthetic-resin base, the base being formed with a plurality of through-holes in the width direction of the vehicle such that the bumper beams penetrate the base via the through-holes, and a strengthening band formed of reinforcement fiber tows, the strengthening band being configured to surround the exterior of the bumper reinforcement member.

The bumper reinforcement member may be formed, in one surface thereof, with a plurality of recesses arranged in a lattice form.

The surface of the bumper reinforcement member, formed with the recesses, may face the vehicle body.

The bumper beams may be formed of high-strength steel via hot stamping.

The bumper reinforcement member may be formed via injection-molding on outer surfaces of the bumper beams in a state in which the bumper beams are in a mold.

The strengthening band may be formed by winding the reinforcement fiber tows around the exterior of the bumper reinforcement member.

The strengthening band may have the same width as that of the bumper reinforcement member so as to surround the exterior of the bumper reinforcement member.

The bumper unit may further include a coating layer molded using a synthetic resin so as to coat an outer surface of the strengthening band surrounding the bumper reinforcement member.

The coating layer may be formed via injection-molding on the outer surface of the strengthening band in a state in which the bumper reinforcement member surrounded by the strengthening band is inserted into a mold.

The bumper reinforcement member may be located at a central portion of the bumper beams.

In accordance with one aspect of the present invention, there is provided a method for manufacturing a bumper unit of a vehicle, including seating a plurality of bumper beams in a mold, injection-molding a bumper reinforcement member by injecting a synthetic resin into the mold in which the bumper beams have been inserted, and surrounding a strengthening band, formed of reinforcement fiber tows, around the exterior of the molded synthetic-resin bumper reinforcement member.

The method may further include seating the bumper reinforcement member, surrounded by the strengthening band, in a mold, and injection-molding a coating layer on an outer surface of the strengthening band by injecting a synthetic resin into the mold in which the bumper reinforcement member, surrounded by the strengthening band, has been inserted.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Reference will now be made in detail to the preferred embodiments of the present invention, examples of which are illustrated in the accompanying drawings. Wherever possible, the same reference numbers will be used throughout the drawings to refer to the same or like parts.

Figure 1:
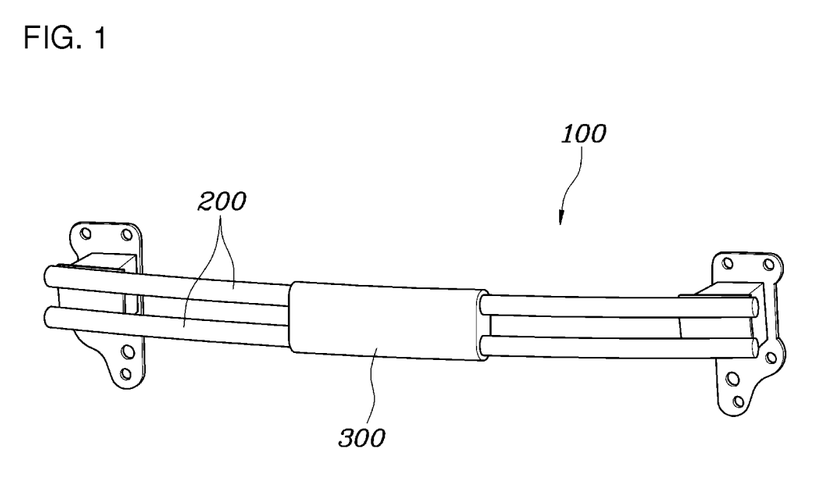
FIG. 1 is a perspective view illustrating a bumper unit of a vehicle according to an embodiment of the present invention.
Figure 2:
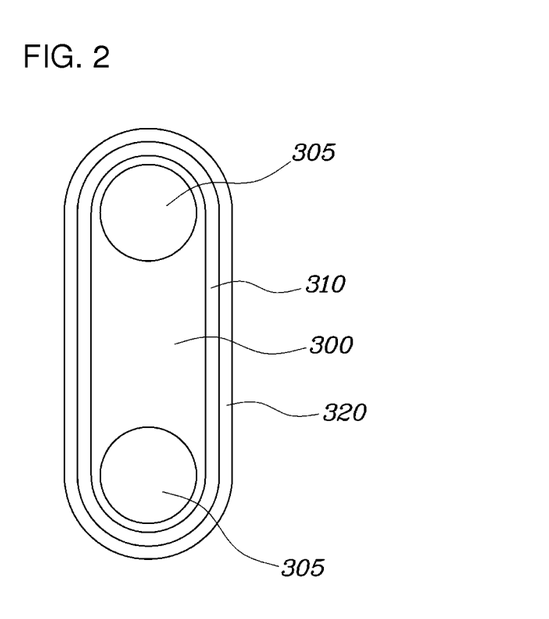
FIG. 2 is a side view illustrating a bumper reinforcement member, a strengthening band, and a coating layer according to the embodiment of the present invention.
Figure 3:
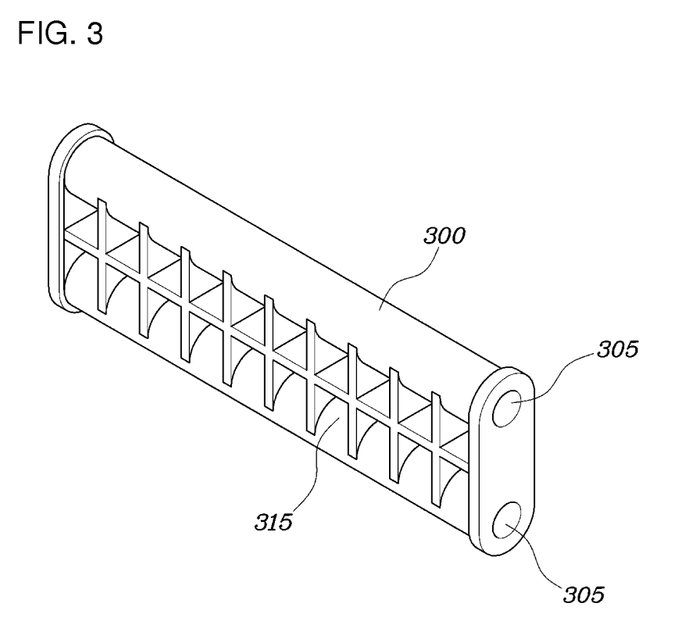
FIG. 3 is a perspective view illustrating recesses formed in one surface of the bumper reinforcement member included in the bumper unit of the vehicle according to the embodiment of the present invention.
Figure 4:
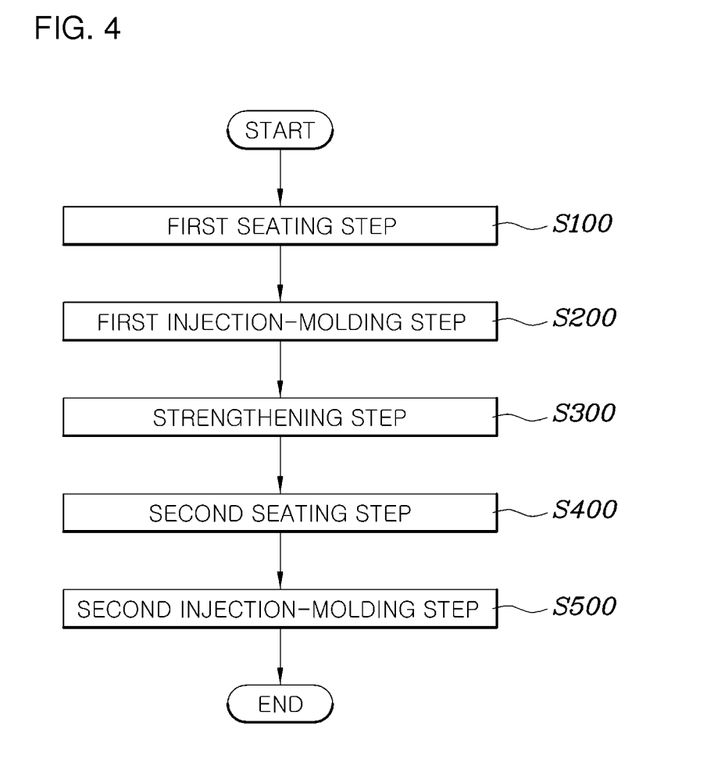
FIG. 4 is a flowchart illustrating a method for manufacturing the bumper unit of the vehicle according to the embodiment of the present invention.

FIG. 1 is a perspective view illustrating a bumper unit 100 of a vehicle according to an embodiment of the present invention; FIG. 2 is a side view illustrating a bumper reinforcement member 300, a strengthening band 310, and a coating layer 320 according to the embodiment of the present invention; FIG. 3 is a perspective view illustrating recesses 315 formed in one surface of the bumper reinforcement member 300 included in the bumper unit 100 of the vehicle according to the embodiment of the present invention; and FIG. 4 is a flowchart illustrating a method for manufacturing the bumper unit 100 of the vehicle according to the embodiment of the present invention.

The bumper unit 100 of the vehicle according to the present invention may achieve a reduction in weight and enhanced safety required in the event of a vehicle collision in a simplified and effective manner, as compared to bumper units of the related art.

As exemplarily illustrated in FIGS. 1 and 2, the bumper unit 100 of the vehicle according to the present invention includes a plurality of bumper beams 200 arranged in the width direction of the vehicle, both ends of each of the bumper beams 200 being coupled to a vehicle body, a bumper reinforcement member 300 configured as a molded synthetic-resin base formed with a plurality of through-holes 305 in the width direction of the vehicle such that the bumper beams 200 penetrate the through-holes 305, and a strengthening band 310 formed of reinforcement-fiber tows, the strengthening band 310 being configured to surround the exterior of the bumper reinforcement member 300.

Considering the above-described configuration in detail, the bumper beams 200 may be arranged in the width direction of the vehicle, and each of the bumper beams 200 may be coupled at both ends thereof to both sides of the vehicle body. Of course, although the bumper beams 200 of the present invention have a pipe shape, the bumper beams 200 may have any of various other cross-sectional shapes.

In addition, the central portion of each of the bumper beams 200 may have a gently bent shape so as to protrude outward from the vehicle body, which may minimize air resistance. In addition, as exemplarily illustrated in FIG. 1, the bumper beams 200 may be arranged above one another in the vertical direction of the vehicle.

Accordingly, as the bumper beams 200 are configured as a plurality of pipes, unlike a conventional bumper beam which has a prescribed width in the height direction of a vehicle, no material is present in spaces between the bumper beams 200, which may result in a considerable reduction in the weight of the bumper unit 100, and consequently, in the weight of the vehicle body.

Meanwhile, the empty spaces defined between the bumper beams 200 may considerably reduce air resistance during driving, unlike the related art, which has the effect of considerably improving, for example, fuel economy.

In addition, the bumper beams 200 may be formed of high-strength steel via various methods. As such, the bumper beams 200 may have a higher strength despite having the same volume and weight.

Meanwhile, the bumper reinforcement member 300 may be configured as the molded synthetic-resin base, the base may be formed with the through-holes 305 in the width direction of the vehicle, and the bumper beams 200 may penetrate the base via the through-holes 305.

Specifically, the synthetic resin forming the bumper reinforcement member 300 may be selected from among various kinds such as, for example, plastic and epoxy. The through-holes 305 preferably are provided in a number equal to that of the bumper beams 200, which are provided to constitute the bumper unit 100 of the vehicle according to the present invention, such that the bumper beams 200 are connected to one another by the base.

In the event of a vehicle collision, the respective bumper beams 200 need to independently bear the collision load because there is no load path between the bumper beams 200, unlike the case where a plate-shaped bumper beam is used.

At this time, an excessively high load may be applied to some of the bumper beams 200 in some cases. Therefore, through the provision of the bumper reinforcement member 300 in which the respective bumper beams 200 are coupled via the through-holes 305, the respective bumper beams 200 may realize inter-transmission of load, which results in increased resistance to shocks owing to the distribution of the load.

That is, the bumper beams 200 of the present invention may be configured as pipe-shaped bumper beams 200, and the bumper reinforcement member 300 is provided to form a load path that enables the distribution of load between the bumper beams 200 in order to compensate for the deterioration in rigidity attributable to the pipe-shaped bumper beams 200.

In addition, when shocks are transmitted to the bumper unit 100 of the vehicle according to the present invention, for example, the bumper beams 200 may be deformed so as to be bent into the spaces between the bumper beams 200 defined in the longitudinal direction and the height direction of the vehicle. The bumper reinforcement member 300 coupled to the bumper beams 200 may prevent this deformation to some extent, thereby contributing to an increase in durability.

Meanwhile, in the case where the bumper unit 100 includes the bumper beams 200 acquired via hot stamping, coupling a reinforcement member to the bumper beams 200 via welding is practically impossible because of a limitation related to the increase in brittleness due to the heat of welding. Therefore, the bumper beams 200 generally cannot be formed via hot stamping in consideration of the coupling of the reinforcement member.

For this reason, the bumper reinforcement member 300 may be formed of a synthetic resin, rather than a steel material, and may be coupled via fitting, rather than welding, so as to overcome the brittleness problem. This bumper reinforcement member 300 advantageously enables the bumper beams 200 to be formed via hot stamping.

In addition, as exemplarily illustrated in FIG. 2, the strengthening band 310 is formed of reinforcement-fiber tows and is configured to surround the exterior of the bumper reinforcement member 300.

Specifically, reinforcement fibers constituting the strengthening band 310 may be any of various materials such as, for example, carbon fibers and glass fibers. The strengthening band 310 may be formed by stacking reinforcement-fiber tows, corresponding to bundle-shaped reinforcement fiber units, multiple times.

In addition, the strengthening band 310 formed of reinforcement-fiber tows may be formed in advance so as to thereby come into close contact with the outer surface of the bumper reinforcement member. Alternatively, the strengthening band 310 may be formed by surrounding the bumper reinforcement member 300 with reinforcement-fiber tows. As such, various other methods may be used to form the strengthening band 310. In addition, the strengthening band 310 may be adhered via thermal fusion once it has surrounded the outer surface of the bumper reinforcement member 300.

As described above, as the bumper reinforcement member 300 is provided to supplement durability, which may be somewhat reduced due to the presence of spaces between the bumper beams 200, and as the strengthening band 310 having a high strength is provided at the outer surface of the bumper reinforcement member 300, the resulting bumper unit 100 may meet requirements for sufficient endurance strength.

Accordingly, owing to the high-strength strengthening band 310, it is possible to enhance the rigidity and shape maintenance ability of the bumper reinforcement member 300 and to reduce the weight of the vehicle body.

Meanwhile, as exemplarily illustrated in FIG. 3, the bumper unit 100 of the vehicle according to the present invention may have recesses 315 arranged in a lattice pattern in one surface of the bumper reinforcement member 300.

The recesses 315 may have any of various cross-sectional shapes such as, for example, a rectangular shape or a hexagonal shape. The recesses 315 may resemble ribs formed between the respective recesses 315. The depth of the recesses 315 may be determined such that the recesses 315 do not penetrate the bumper reinforcement member 300.

The bumper reinforcement member 300, which forms the load path between the bumper beams 200, have the recesses 315 formed in one surface thereof in order to achieve sufficient load transmission ability and to reduce the weight of the vehicle body. The recesses 315 may define a lattice arrangement in order to satisfy required strength, which may prevent the likelihood of stress being concentrated in some regions. In addition, the ribs between the neighboring recesses 315 enable the absorption and transmission of shocks between the bumper beams 200.

In this way, the bumper reinforcement member 300 is formed so as to satisfy required strength in structural terms via the lattice arrangement and the formation of ribs, to prevent unnecessary material consumption, and to reduce the weight of the vehicle body.

In addition, one surface of the bumper reinforcement member 300, formed with the recesses 315, according to the present invention may face the vehicle body.

Assuming that the surface formed with the recesses 315 is located at the opposite side of the vehicle body, this will prevent the smooth flow of air on the surface, compared to a planar surface, while a vehicle is being driven, which may increase the resistance of air, causing deterioration in driving efficiency.

Therefore, the surface of the bumper reinforcement member 300, formed with the recesses 315, is oriented to face the vehicle body, so as to prevent an increase in the resistance of air and to enhance driving efficiency.

Meanwhile, the bumper beams 200 of the present invention may be formed of high-strength steel via hot stamping.

Hot stamping is a method in which steel forming is implemented at high temperatures, and the cooling rate is adjusted to adjust the strength of steel. Such hot stamping may be advantageous in terms of a reduction in the weight of the vehicle body and the realization of a required strength because it imparts a higher strength to the same steel.

In the case where the bumper beams 200, formed via hot stamping, constitute the bumper unit 100, it is practically impossible to couple a reinforcement member via welding because of a limitation related to the increase in brittleness due to the heat of welding. Therefore, for the coupling of the reinforcement member, generally, the bumper beams 200 cannot be formed using hot stamping.

To solve this problem, the present invention is intended to increase the strength of the bumper unit 100 using the bumper reinforcement member 300, which is formed of a synthetic resin, rather than steel, and which is coupled via fitting, rather than welding. As such, it is possible to solve the brittleness problem even if the bumper beams 200 are formed via hot stamping. Therefore, hot stamping may be used to form the bumper beams 200, which is advantageous in realizing the required strength.

Accordingly, the safety of the vehicle in the event of a collision may be increased by achieving higher rigidity despite having the same weight and volume through the use of hot stamping, which is advantageous in realizing the required strength, in order to prevent deterioration in rigidity caused by spaces between the bumper beams 200.

Meanwhile, the bumper reinforcement member 300 of the present invention may be formed via injection-molding by inserting the bumper beams 200 into a mold and injecting a synthetic resin around the outer surface of the bumper beams 200.

Specifically, in the case where the bumper reinforcement member 300 is separately molded and the bumper beams 200 are inserted into the bumper reinforcement member 300, voids are inevitably present between the bumper beams 200 and the through-holes 305 in which the bumper beams 200 are inserted. This may problematically reduce the coupling force between the bumper reinforcement member 300 and the bumper beams 200.

Accordingly, as the bumper reinforcement member 300 is injection-molded on the outer surface of the bumper beams 200 inserted into the mold, it is possible to considerably increase the coupling force at the coupling region of the bumper reinforcement member 300 and the bumper beams 200 by preventing the inevitable generation of voids due to the separate molding process.

Meanwhile, the strengthening band 310 of the present invention may be formed as the reinforcement fiber tows are wound around the bumper reinforcement member 300.

The reinforcement fibers, which constitute the strengthening band 310, have high strength, but may be easily broken when the fibers have seams and a load is concentrated on the seams.

Therefore, in the case where a plurality of unit bands 310, which are prepared by cutting reinforcement fibers at a prescribed length, is wound around the outer surface of the bumper reinforcement member 300, fiber seams are present in the respective unit bands 310, which results in a reduction in substantial strength.

Accordingly, by continuously winding reinforcement fiber tows around the outer surface of the bumper reinforcement member 300 so as to form the strengthening band 310 having no seams, it is possible to prevent the formation of seams in the reinforcement fibers constituting the strengthening band 310, thereby advantageously preventing breakage due to strong shocks.

Meanwhile, the strengthening band 310 of the present invention has the same width as the bumper reinforcement member 300 so as to surround the exterior of the bumper reinforcement member 300.

Assuming that the strengthening band 310 surrounds only a portion of the bumper reinforcement member 300, the portion surrounded by the strengthening band 310 and the remaining portion not surrounded by the strengthening band 310 have different strengths and durabilities, thus causing local damage to the bumper reinforcement member 300 when shocks are applied to the vehicle.

Accordingly, the strengthening band 310 may have the same width as the bumper reinforcement member 300 to prevent any portion of the outer surface of the bumper reinforcement member 300 from not being surrounded by the strengthening band 310, which may stably improve the durability of the bumper reinforcement member 300 and improve the safety of the vehicle.

Meanwhile, as exemplarily illustrated in FIG. 2, the bumper unit 100 of the vehicle according to the present invention may further include a coating layer 320 which is molded using a synthetic resin, the outer surface of the strengthening band 310 surrounding the bumper reinforcement member 300 being coated with the coating layer 320.

The synthetic resin that forms the coating layer 320 may be the same as the synthetic resin that constitutes the bumper reinforcement member 300. The strengthening band 310 formed of the reinforcement fibers may be impregnated in the synthetic resin of the coating layer 320. The use of synthetic resin may contribute to a reduction in the weight of the vehicle and improve durability.

The strengthening band 310 and the bumper reinforcement member 300 are formed of different materials, thus having low coupling stability. The strengthening band 310 formed of reinforcement fibers may be formed such that the fibers have low strength of adhesion therebetween. Therefore, the strengthening band 310 may have difficulty in maintaining the shape thereof as time passes, and a portion of the strengthening band 310 may be separated.

Accordingly, by providing the coating layer 320, which is formed of the same material as the bumper reinforcement member 300, on the outer surface of the strengthening band 310, it is possible to increase the coupling force between the strengthening band 310 and the bumper reinforcement member 300 and to enable the integral formation of the coating layer 320, the strengthening band 310, and the bumper reinforcement member 300, so as to improve safety and durability.

In addition, the coating layer 320 of the present invention may be formed via injection-molding by inserting the bumper reinforcement member 300, surrounded by the strengthening band 310, into a mold, and injecting a synthetic resin around the outer surface of the bumper reinforcement member 300.

In the case where the coating layer 320 is separately molded and fitted to the outer surface of the bumper reinforcement member 300 surrounded by the strengthening band 310, a gap between the strengthening band 310 and the coating layer 320 is inevitably necessary to ensure easy coupling, and, for example, an adhesive is required to couple the two to each other.

However, since no gap is generated when the bumper reinforcement member 300 surrounded by the strengthening band 310 is directly inserted into a mold, and then the coating layer 320 is injection-molded on the outer surface of the bumper reinforcement member 300, improved coupling force may be realized by the anchor effect of the strengthening band 310 impregnated in the synthetic resin when the coating layer 320 is injection-molded.

In addition, since the synthetic resin for the injection-molding of the coating layer 320 is the same as the synthetic resin constituting the bumper reinforcement member 300, the coating layer 320 may be integrally coupled with the bumper reinforcement member 300 when the coating layer 320 is injection-molded, which may result in the entire integrated configuration.

That is, as the coating layer 320 is injection-molded by inserting the bumper reinforcement member 300 into a mold, the bumper reinforcement member 300, the strengthening band 310, and the coating layer 320 may be integrally coupled with one another, which may maximize the coupling force of the coating layer 320 and ensure the stable adhesion of the strengthening band 310.

Meanwhile, as exemplarily illustrated in FIG. 1, in the present invention, the bumper reinforcement member 300 may be located at the central portion of the bumper beams 200.

The bumper beams 200 are fixedly coupled at both ends thereof to the vehicle body as described above. At this time, when shocks generated in the event of a vehicle collision are transmitted to the bumper beams 200, the central portion of the bumper beams 200, located at the farthest distance from the fixed ends, are deformed.

Accordingly, when the bumper reinforcement member 300 for improving the durability of each of the bumper beams 200 is located at the central portion of the bumper beams 200, the most efficient durability enhancement effect may be acquired and the required resistance to vehicle collisions may also be acquired, even if the bumper reinforcement member 300 is not provided in a plural number.

Meanwhile, as exemplarily illustrated in FIG. 4, a method for manufacturing the bumper unit 100 of the vehicle according to the present invention includes a first seating step S100 of seating the bumper beams 200 in a mold, a first injection-molding step S200 of molding the bumper reinforcement member 300 by injecting a synthetic resin into the mold in which the bumper beams 200 have been inserted, and a strengthening step S300 of surrounding the exterior of the molded synthetic-resin bumper reinforcement member 300 with the strengthening band 310, which is formed of reinforcement fiber tows.

In the first seating step S100, the bumper beams 200 are seated in the mold, which is prepared in advance to enable the insertion of the bumper beams 200. The central portions of the bumper beams 200 may be seated in the mold. The mold is shaped to have the same cavity as the outer contour of the bumper reinforcement member 300.

In addition, in the first injection molding step S200, the synthetic resin is inserted into the mold, in which the bumper beams 200 have been inserted, so as to mold the bumper reinforcement member 300. The synthetic resin may be any one of various kinds such as, for example, polypropylene, plastic, and polyethylene.

In particular, in the manufacturing method of the present invention, as the bumper reinforcement member 300 is directly injection-molded on the outer surfaces of the bumper beams 200, stronger coupling therebetween, simplified processing, and enhanced durability may be realized.

In addition, one surface of the mold may be formed to have a plurality of protrusions in the lattice arrangement, such that one surface of the molded bumper reinforcement member 300 is provided with the recesses 315 in the lattice arrangement. In this way, the recesses 315 may be provided in the injection-molding step even if a secondary process is not implemented.

Meanwhile, in the strengthening step S300, the outer surface of the bumper reinforcement member 300, formed by the first injection molding step S200, is surrounded by the strengthening band 310 to achieve increased strength. The strengthening band 310 is formed of reinforcement fiber tows.

The outer surface of the bumper reinforcement member 300 may be surrounded by the strengthening band 310 via various methods. In particular, the outer surface of the bumper reinforcement member 300 may be directly surrounded by the reinforcement fiber tows via winding to form the strengthening band 310.

Winding is a method in which a fibrous reinforcing material is wound around the outer surface of an object to increase the strength of the object or to coat the object. Generally, the object is seated on a winding machine, and thereafter the fibrous reinforcing material is wound while the object is rotated.

In this way, the strengthening band 310 may come into close contact with the bumper reinforcement member 300, and may be formed without any seams of reinforcement fibers, thereby achieving excellent effects in terms of rigidity.

Meanwhile, as exemplarily illustrated in FIG. 4, the method for manufacturing the bumper unit 100 of the vehicle according to the present invention may further include a second seating step S400 of seating the bumper reinforcement member 300, surrounded by the strengthening band 310, in a mold; and a second injection-molding step S500 of molding a coating layer 320 on the outer surface of the strengthening band 310 by injecting a synthetic resin into the mold in which the bumper reinforcement member 300, surrounded by the strengthening band 310, has been inserted.

The bumper reinforcement member 300, surrounded by the strengthening band 310 in the strengthening step S300, is seated in a previously prepared mold. The mold has been formed with a cavity such that the bumper reinforcement member 300 may be seated in the cavity. The strengthening band 310 may be seated in the mold immediately after the winding thereof, and may be inserted into the mold after being adhered to the outer surface of the bumper reinforcement member 300 via thermal fusion.

In the second injection-molding step S500, the coating layer 320 is formed as the synthetic resin is inserted into the mold in which the bumper reinforcement member 300 has been inserted. The mold may be divided into two parts, and the two mold parts may be coupled to form a single nest after the inserted material is seated therein.

The synthetic resin, which forms the coating layer 320, may be the same as the synthetic resin of the bumper reinforcement member 300. Thus, as the synthetic resin is injected into the mold, the strengthening band 310 is impregnated in the synthetic resin, and may be integrally formed with the bumper reinforcement member 300.

In conclusion, the coating layer 320 is formed on the outer surface of the strengthening band 310, thus enabling the stable fixing of the strengthening band 310, and consequently, improving the durability of the bumper reinforcement member 300. As such, the bumper reinforcement member 300, the strengthening band 310, and the coating layer 320 may be integrally formed with one another, which results in improved stability and durability as well as a reduction in the weight of the vehicle.

As is apparent from the above description, a bumper unit of a vehicle having the above-described configuration and a method for manufacturing the same according to the present invention may achieve a reduction in the weight of the vehicle and satisfy vehicle collision safety requirements.

In particular, providing a plurality of bumper beams in the form of pipes may reduce the weight of the vehicle, and providing a synthetic resin base for penetration of the bumper beams may realize the reduced weight of the vehicle and load transmission between the pipes. In addition, the required strength in the event of a vehicle collision may be acquired by surrounding the base with strengthening fibers.

In addition, as the base is injection-molded by inserting the bumper beams in the form of pipes into a mold, the coupling relationship between the base and the bumper beams may be improved, and repeatedly injection-molding the base after surrounding the base with the strengthening band may considerably increase the coupling force between the strengthening band, the base, and the pipes, which results in a considerable increase in the strength of the bumper unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A bumper unit of a vehicle, comprising:
a plurality of bumper beams arranged in a width direction of the vehicle, each of the bumper beams being coupled at both ends thereof to a vehicle body;
a bumper reinforcement member configured as a molded synthetic-resin base, the base being formed with a plurality of through-holes in the width direction of the vehicle such that the bumper beams penetrate the base via the through-holes; and a strengthening band formed of reinforcement fiber tows, the strengthening band being configured to surround the exterior of the bumper reinforcement member, wherein the strengthening band and bumper reinforcement member are formed of different materials, and wherein the bumper reinforcement member is located only at a central portion of the bumper beams.

2. The bumper unit according to claim 1, wherein the bumper beams are formed of high-strength steel via hot stamping.

3. The bumper unit according to claim 1, wherein the bumper reinforcement member is formed via injection-molding on outer surfaces of the bumper beams in a state in which the bumper beams are in a mold.

4. The bumper unit according to claim 1, wherein the strengthening band is formed by winding the reinforcement fiber tows around the exterior of the bumper reinforcement member.

5. The bumper unit according to claim 1, wherein the strengthening band has the same width as that of the bumper reinforcement member so as to surround the exterior of the bumper reinforcement member.

6. The bumper unit according to claim 1, further comprising a coating layer molded using a synthetic resin so as to coat an outer surface of the strengthening band surrounding the bumper reinforcement member.

7. The bumper unit according to claim 6, wherein the coating layer is formed via injection-molding on the outer surface of the strengthening band in a state in which the bumper reinforcement member surrounded by the strengthening band is inserted into a mold.

* * * * *